(12) United States Patent
Monfraix et al.

(10) Patent No.: US 10,414,502 B2
(45) Date of Patent: Sep. 17, 2019

(54) METHOD OF AUTOMATIC POSITIONING OF A SEAT

(71) Applicant: Airbus Operations SAS, Toulouse (FR)

(72) Inventors: Jean Monfraix, Leguevin (FR); Mathieu Collignon, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 190 days.

(21) Appl. No.: 15/645,692

(22) Filed: Jul. 10, 2017

(65) Prior Publication Data
US 2018/0009533 A1 Jan. 11, 2018

(30) Foreign Application Priority Data
Jul. 11, 2016 (FR) ..................... 16 56620

(51) Int. Cl.
| | | |
|---|---|---|
| B64D 11/06 | (2006.01) | |
| G06T 7/73 | (2017.01) | |
| G06K 9/00 | (2006.01) | |
| H04N 5/247 | (2006.01) | |
| B60N 2/02 | (2006.01) | |

(52) U.S. Cl.
CPC .......... *B64D 11/064* (2014.12); *B60N 2/0248* (2013.01); *B64D 11/0689* (2013.01); *B64D 11/06395* (2014.12); *G06K 9/00248* (2013.01); *G06K 9/00255* (2013.01); *G06K 9/00604* (2013.01); *G06K 9/00838* (2013.01); *G06T 7/74* (2017.01); *H04N 5/247* (2013.01);
(Continued)

(58) Field of Classification Search
CPC ............ B64D 11/064; B64D 11/06395; B64D 11/0689; G06T 7/74; G06T 2207/30201; B60N 2/0248; B60N 2002/0268; G06K 9/00248; G06K 9/00255; G06K 9/00604; G06K 9/00838; H04N 5/247
USPC ............................................................ 701/49
See application file for complete search history.

(56) References Cited

U.S. PATENT DOCUMENTS
| | | |
|---|---|---|
| 4,811,226 A | 3/1989 | Shinohara |
| 7,126,583 B1 | 10/2006 | Breed |
| (Continued) | | |

FOREIGN PATENT DOCUMENTS
| | | |
|---|---|---|
| WO | 0145080 | 6/2001 |

OTHER PUBLICATIONS

French Search Report, dated Mar. 15, 2017, priority document.

*Primary Examiner* — Gertrude Arthur Jeanglaude
(74) *Attorney, Agent, or Firm* — Greer, Burns & Crain, Ltd.

(57) ABSTRACT

A method of automatic positioning a seat in an apparatus comprising two cameras located on either side of the seat, each one in a position able to acquire images of a face of a user seated on the seat. The seat comprises at least one motor, each motor acting on a position of the seat along a predefined axis. The method comprises: for each camera: obtaining a position of a predefined image zone in which at least one eye of a user of the apparatus should be located; acquiring an image of a user seated on the seat; detecting at least one eye of the seated user in the image acquired; and obtaining a relative position between each eye detected and the predefined zone. By using each relative position obtained, at least one motor is actuated until each predefined zone contains at least one eye of the seated user.

10 Claims, 5 Drawing Sheets

(52) U.S. Cl.
CPC ............... *B60N 2002/0268* (2013.01); *G06T 2207/30201* (2013.01)

(56) References Cited

U.S. PATENT DOCUMENTS

| | | |
|---|---|---|
| 2003/0209893 A1 | 11/2003 | Breed et al. |
| 2008/0276191 A1 | 11/2008 | Breed |
| 2009/0108649 A1* | 4/2009 | Kneller ................. B64D 11/00 297/217.6 |
| 2015/0092083 A1* | 4/2015 | Lam .................... G02B 27/017 348/234 |

* cited by examiner

METHOD OF AUTOMATIC POSITIONING OF A SEAT

CROSS-REFERENCES TO RELATED APPLICATIONS

This application claims the benefit of the French patent application No. 1656620 filed on Jul. 11, 2016, the entire disclosures of which are incorporated herein by way of reference.

BACKGROUND OF THE INVENTION

The present invention concerns a method of positioning a seat in an apparatus and a device implementing the method.

In many situations, a user needs to be located in an apparatus in a relatively precise position in order to be able to make use of that apparatus. This is the case, in particular, with vehicles such as automobiles or aircraft in which a driver or pilot needs to be located in a practical position in order to have easy access to the various controls of that vehicle and have a proper view of the outside (front downward view, side view). Yet it is rare for vehicles to be designed only for a single pilot. Thus, a vehicle is generally equipped with a generic seat which needs to be adjusted in order to achieve an appropriate position for the piloting. Such generic seats allow pilots of different body types to use the same vehicle. These seats generally allow a height adjustment (i.e., along a vertical axis of the vehicle) or a depth adjustment (i.e., along a horizontal axis of the vehicle).

Certain vehicles have devices allowing a precise positioning of the pilot. This is the case with certain aircraft such as the one described in relation to FIG. 1.

Figure 1:
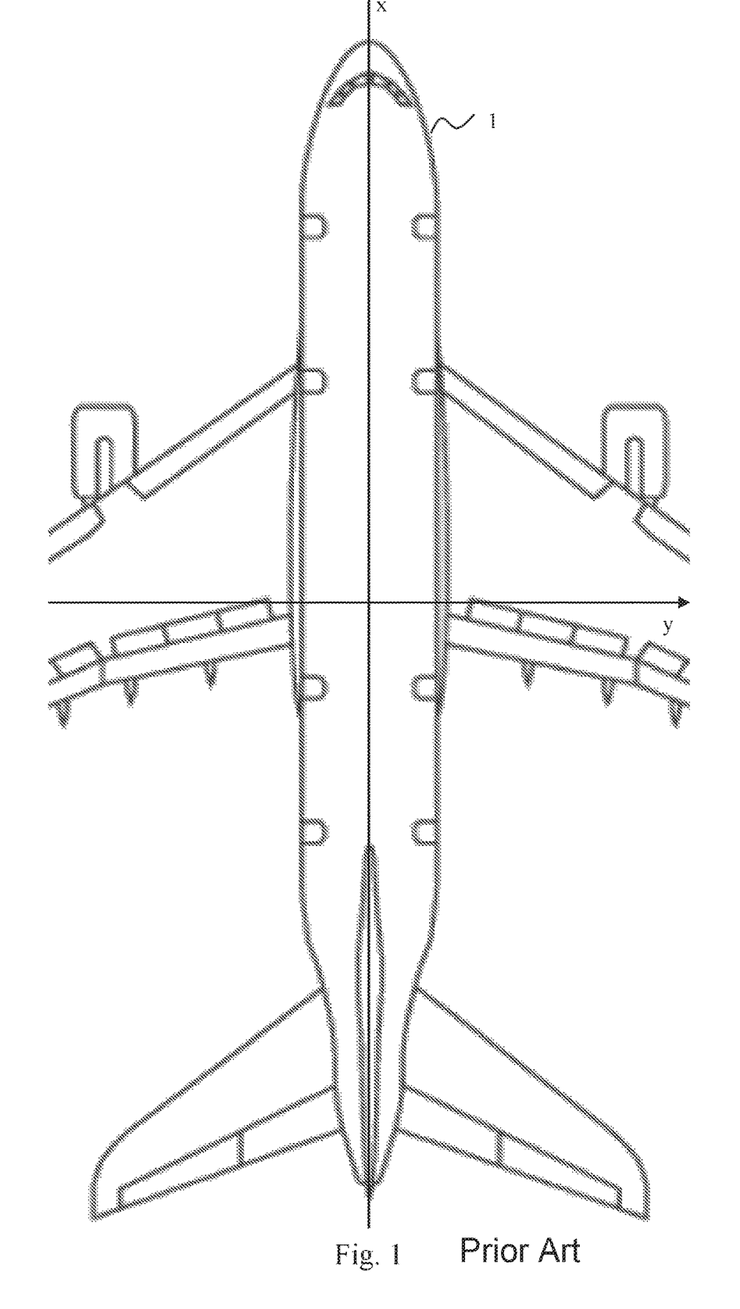
FIG. 1 illustrates schematically an example of a prior art vehicle in which the invention can be realized.

FIG. 1 illustrates schematically an example of a vehicle in which the invention is realized. This vehicle is an airplane 1. The airplane 1 has a first horizontal axis, or x-axis, passing through the fore and aft of the airplane 1, a second horizontal axis, or y-axis, perpendicular to the x-axis, and a vertical axis not shown, or z-axis, perpendicular to the x- and y-axes.

Figure 2:
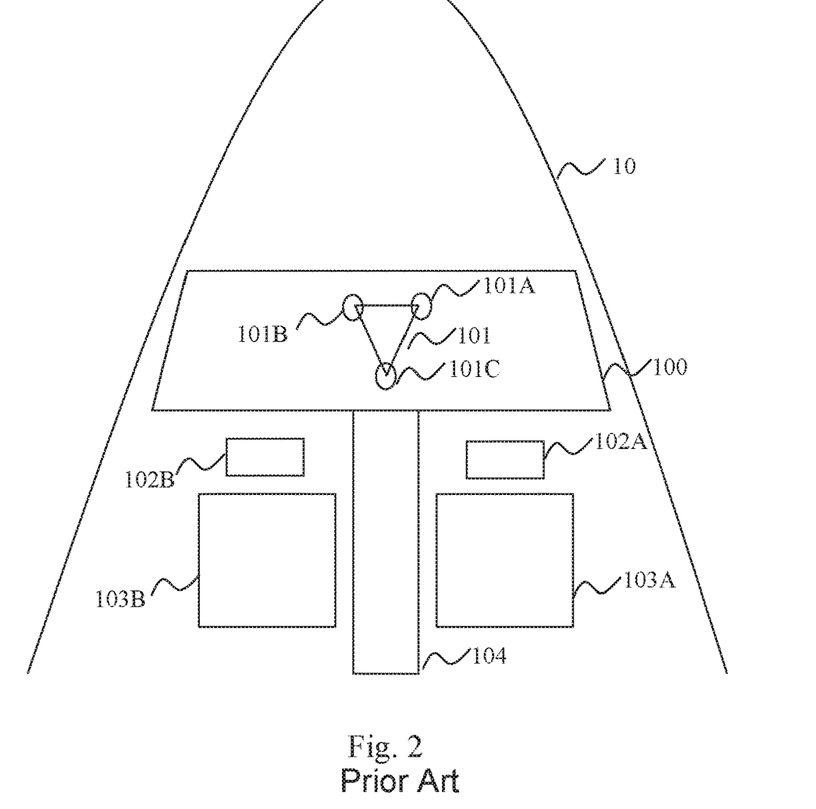
FIG. 2 illustrates schematically a prior art cockpit of a vehicle in which the invention can be realized.

FIG. 2 illustrates schematically a cockpit 10 of the airplane 1 known in the prior art. The cockpit 10 comprises a first console 100 having display units showing, in particular, the navigation parameters of the airplane 1, a second console 104 containing, in particular, the control units for controlling the power of the engines of the airplane 1, two control units 102A and 102B such as handles, and two seats 103A and 103B. In this example, each seat can be adjusted along the x-axis and the z-axis. The position of the seat along the y-axis is fixed on account of the need to be positioned in an axis for display of primary flight parameters.

The cockpit 10 comprises, in front of the first console 100, a device 101 used to position the seats 103A and 103B so that each pilot can be ideally situated in the cockpit 10. The device 101 comprises three elements 101A, 101B and 101C. A pilot is properly situated in the cockpit (i.e., the pilot's seat is well adjusted) if, when seated in his seat, he is looking at the element of the device 101 closest to him (i.e., element 101C), which hides one of the other two elements of the device 101.

Figure 3:
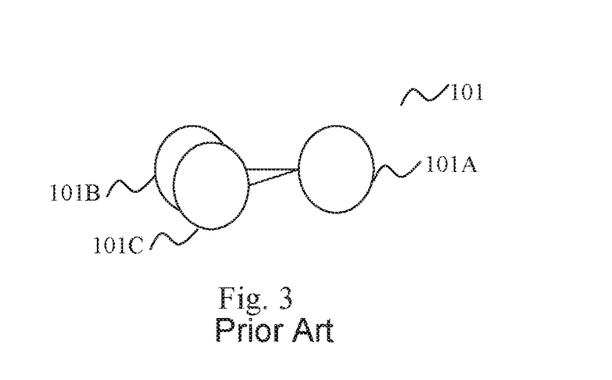
FIG. 3 illustrates schematically a device of the prior art used in a cockpit to position a seat.

FIG. 3 shows schematically the device 101 used in the cockpit 10 to position one of the seats 103A and 103B. In the example of FIG. 3, a pilot is in the process of adjusting the seat 103A. The element 101C hides nearly all of the element 101B. When the element 101C hides all of the element 101B, the seat 103A is considered to be properly adjusted. To obtain such an alignment of the elements 101C and 101B (or 101C and 101A), the pilot needs to manipulate control units such as buttons or joysticks (not shown) in order to modify the position of the seat 103A (or 103B). This method of positioning may be tedious and may result in wrong positioning.

It is desirable to improve these drawbacks of the prior art. In particular, it is desirable to propose a method which enables an automatic positioning of a seat of an apparatus in dependence on the person who is seated on it. For example, it is desirable to propose a method which enables positioning a seat of a vehicle such that the pilot of that vehicle is ideally situated in the vehicle.

SUMMARY OF THE INVENTION

According to a first aspect of the present invention, the present invention concerns a method of automatic positioning of a seat in an apparatus comprising two cameras located on either side of the seat, each one in a position able to acquire images of the face of a user seated on the seat, the seat comprising at least one motor, each motor acting on a position of the seat along a predefined axis. The method comprises, for each camera: obtaining a position of a predefined image zone in which at least one eye of a user of the apparatus should be located; acquiring an image of a user seated on the seat; detecting at least one eye of the seated user in the image acquired; and obtaining a relative position between each eye detected and the predefined zone; and by using each relative position obtained: actuating at least one motor until each predefined zone contains at least one eye of the seated user.

According to one embodiment, the apparatus is an airplane and the seat is a seat in a cockpit of the airplane.

According to one embodiment, at least one motor is actuated in a repeated manner to modify the position of the seat by a predefined value during each iteration, each modification of the position of the seat being followed by an acquisition of an image by each camera and a detection of the eyes in each image acquired in order to verify the position of each eye detected in each image acquired with respect to the predefined zone.

According to one embodiment, the method involves determining, based on each relative position obtained, how to actuate each motor in order to achieve a position of the seat in which each predefined zone contains at least one eye of the user by utilizing a predefined table associating a set of possible pairs of relative positions, each relative position of a pair being associated with one of the two cameras, and an actuation to be applied to at least one motor.

According to one embodiment, when a position of the seat has been found following an automatic positioning of the seat, a bit of information representative of the position found is saved, the position so saved being used when the user modifies the found position in order to leave the seat, in order to reposition the seat in the found position when the user sits down again.

According to one embodiment, when the user sits down again, each camera makes an acquisition of an image and a detection of the eyes in each image acquired is then carried out to verify that each predefined zone contains at least one eye, the method being carried out again in its entirety if a predefined zone does not contain at least one eye.

According to one embodiment, when a position of the seat has been found following an automatic positioning of the seat, the method involves: adjusting the position of the seat in a predefined zone about the found position.

According to a second aspect of the invention, the invention concerns a device enabling an automatic positioning of a seat in an apparatus comprising two cameras located on either side of the seat in a position able to acquire images of the face of a user seated on the seat, the seat comprising at least one motor, each motor acting on a position of the seat along a predefined axis. The device comprises: for each camera: means of obtaining a position of a predefined image zone in which at least one eye of a user of the apparatus should be located; means of acquisition for acquiring an image of a user seated on the seat; means of detection for detecting at least one eye of the seated user in the image acquired; and means of obtaining a relative position between each eye detected and the predefined zone; means of actuation, using each relative position obtained, for actuating at least one motor until each predefined zone contains at least one eye of the seated user.

According to a third aspect of the invention, the invention concerns a system enabling an automatic positioning of a seat in an apparatus comprising two cameras located on either side of the seat in a position able to acquire images of the face of a user seated on the seat, and a device.

According to a fourth aspect of the invention, the invention concerns a computer program product, containing computer-executable program instructions to carry out, by a computing device, the method according to the first aspect by a processor of the device.

According to a fifth aspect of the invention, the invention concerns a non-transitory storage means storing a computer program containing instructions to carry out or implement, by a device, the method according to the first aspect when the program is executed by a processor of the device.

BRIEF DESCRIPTION OF THE DRAWINGS

The features of the present invention mentioned above, as well as others, will appear more clearly upon perusal of the following description of an exemplary embodiment, the description being given in relation to the enclosed drawings, in which.

DETAILED DESCRIPTION OF THE PREFERRED EMBODIMENTS

The following detailed description is aimed at describing an embodiment of the present invention in an airplane setting. The principles of the present invention, however, apply in a broader context. The principles of the present invention are in fact applicable to other types of vehicles such as automobiles. The principles of the invention could also be applied to apparatuses in which it is necessary to position a seat for the user to be properly positioned in the apparatus, such as a flight simulator or a medical instrument.

Figure 4:
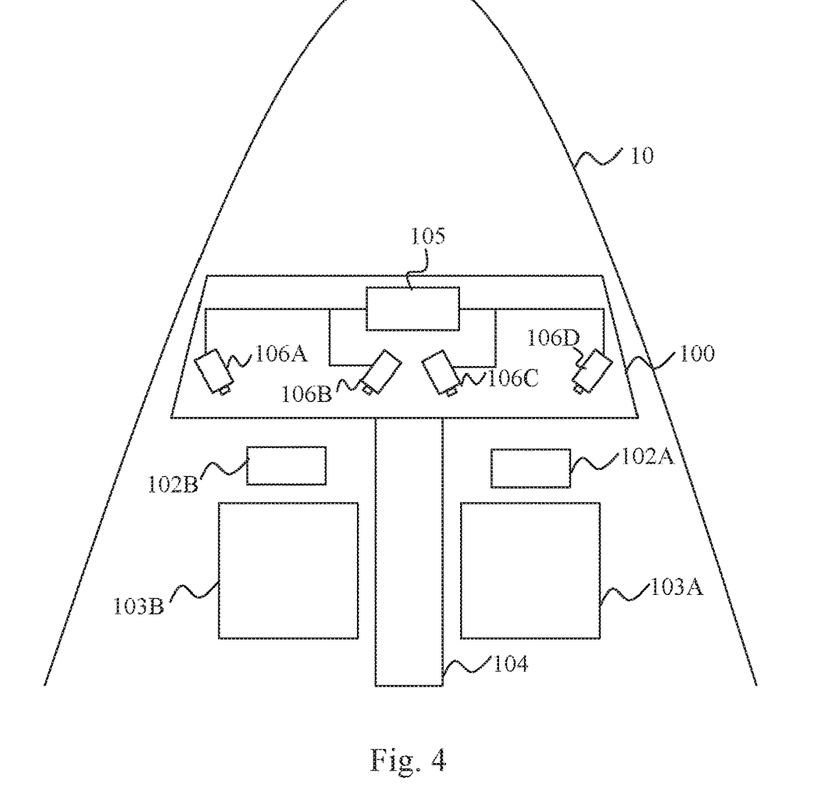
FIG. 4 illustrates schematically a system for automatic positioning of a seat according to the invention.

FIG. 4 illustrates schematically a system for automatic positioning of a seat according to the invention.

The system for automatic positioning of a seat is installed in the cockpit 10 to replace the device 101. This system comprises a processing module 105 able to implement a method according to the invention described below in connection with FIG. 6 and a plurality of cameras. Each seat 103A and 103B is associated with a pair of cameras. Cameras 106A and 106B are associated with the seat 103B and cameras 106C and 106D are associated with the seat 103A. Each camera of a pair of cameras is positioned on either side of the seat with which it is associated in a position able to acquire images of the face of a user who is seated on the seat. In one embodiment, each camera has an optical field such that every possible position of the seat is covered by the camera. In this way, the face of a user who is seated on the seat necessarily appears in every image acquired by the camera.

In this embodiment, the two pairs of cameras are associated with the same processing module 105. However, the processing module 105 independently processes the information coming from each pair of cameras and applies the method described in connection with FIG. 6 independently. In another embodiment, each pair of cameras could be associated with a dedicated processing module.

In this embodiment, each seat 103A and 103B has a plurality of motors, each one able to modify the position of that seat respectively along the x-, y- and z-axes. Each motor is controlled by the processing module according to the method described in connection with FIG. 6. In one embodiment, each motor may also be controlled by buttons or joysticks installed on or in proximity to the seat 103A or 103B.

Figure 5:
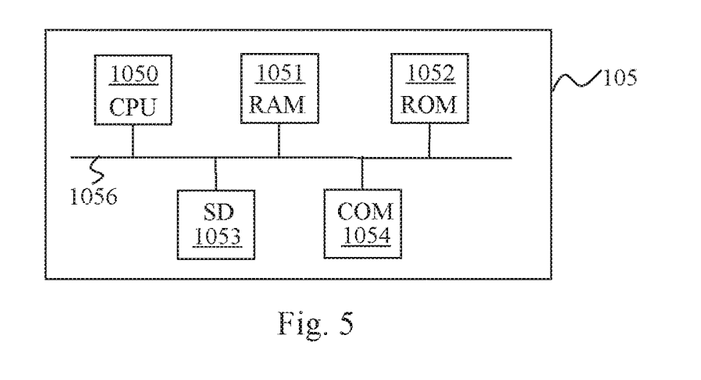
FIG. 5 illustrates schematically a hardware architecture of a processing module able to realize the invention.

FIG. 5 illustrates schematically a hardware architecture of the processing module 105 able to realize the invention.

According to the hardware architecture example represented in FIG. 5, the processing module 105 thus comprises, connected by a communication bus 1056: a processor or CPU (Central Processing Unit) 1050; a RAM (Random Access Memory) 1051; a ROM (Read Only Memory) 1052; a storage unit such as an SD (Secure Digital) card or a storage medium reader, such as an SD (Secure Digital) card reader 1053; and a communication interface 1054 allowing the processing module 105 to communicate with the cameras 106A, 106B, 106C and 106D and with each motor, making possible the modifying of the position of one of the seats 103A and 103B.

The processor 1050 is capable of executing instructions loaded into the RAM 1051 from the ROM 1052, an external memory (not shown), a storage medium (such as an SD card), or a communication network. When the processing module 105 is turned on, the processor 1050 is capable of reading instructions from the RAM 1051 and executing them. These instructions form a computer program causing the processor 1050 to carry out part or all of the method described in connection with FIG. 6.

All or part of the method described in connection with FIG. 6 may be implemented in software form by execution of a set of instructions by a programmable machine, such as a DSP (Digital Signal Processor) or a microcontroller, or implemented in hardware form by a dedicated machine or component, such as an FPGA (Field-Programmable Gate Array) or an ASIC (Application-Specific Integrated Circuit).

Figure 6:
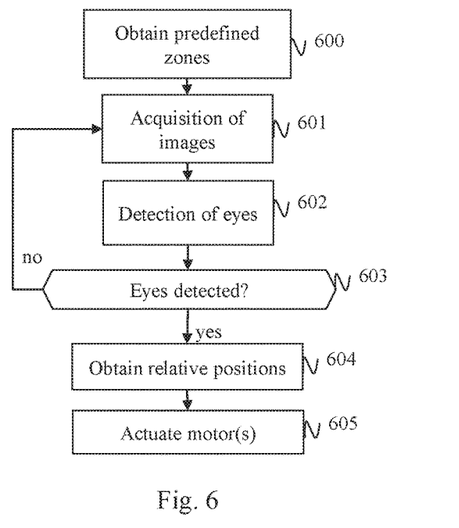
FIG. 6 illustrates schematically a method of automatic positioning of a seat of an apparatus according to the invention.
Figure 7:
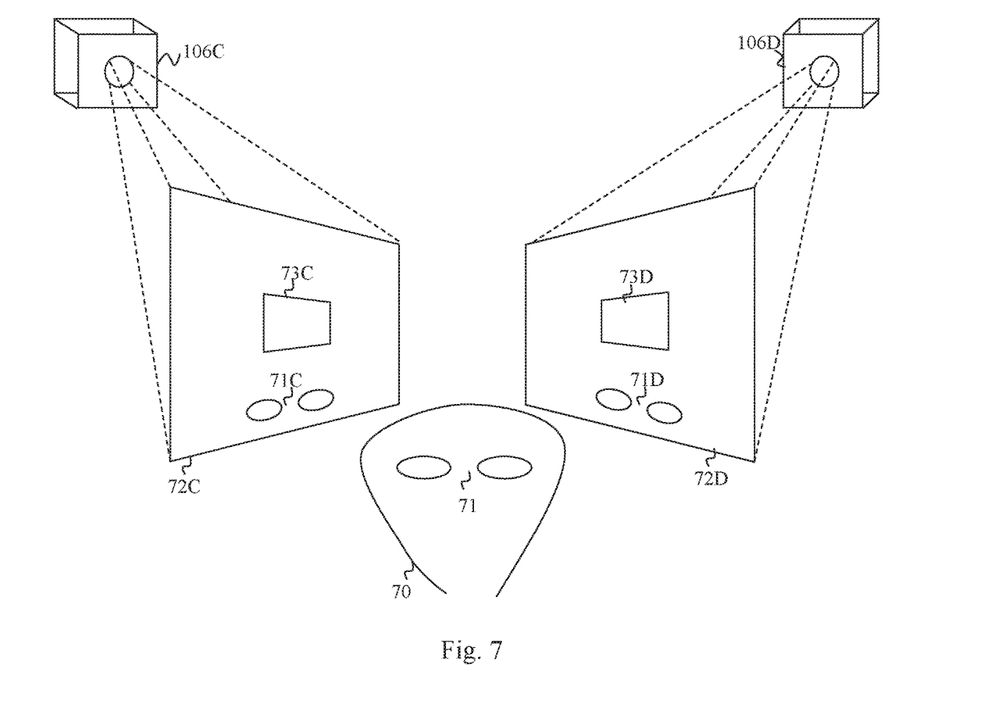
FIG. 7 describes an exemplary situation occurring during the automatic positioning of a seat.

FIG. 7 describes an exemplary situation occurring during the automatic positioning of a seat according to the method described in relation to FIG. 6.

In FIG. 7, a user is seated on the seat 103A and facing the cameras 106C and 106D. The head of the user 70 is positioned in the optical field of the cameras 106C and 106D. The head has two eyes 71 which are seen transparently in FIG. 7. At a time T, the camera 106C (or 106D) makes an acquisition of an image 72C (or 72D). The predefined zone 73C (or 73D) associated with the camera 106C (or 106D) is represented in the image 72C (or 72D). A collection of pixels 71C (or 71D) corresponding to the eyes 71 appears in the image 72C (or 72D). In this example, the seat is wrongly positioned. In fact, at least one of the eyes 71 should appear in the predefined zones 73C and 73D in the images 72C and 72D, respectively. A seat adjustment is necessary.

FIG. 6 illustrates schematically a method of automatic positioning of a seat of an apparatus according to the invention.

In the description of this method, we shall use the example of an automatic positioning of the seat 103A on which the cameras 106C and 106D are focused. The camera 106C (or the camera 106D) is fixed so that each image taken by this camera strictly represents the same scene.

Each camera is associated with a reference image representing the scene. In each reference image there is defined a predefined zone in which the eyes of a user should be located when he is properly seated. In one embodiment, the predefined zone is a rectangle having sides parallel to the sides of the reference image.

In a step 600, the processing module 105 obtains a position of the predefined zone of each reference image. For example, the dimensions of the predefined zone 73C (or 73D) being known, the position of the center of the predefined zone 73C (or 73D) is obtained.

In a step 601, the camera 106C and the camera 106D make an acquisition of an image. In one embodiment, the cameras 106C and 106D are synchronized (i.e., the cameras 106C and 106D make simultaneous acquisitions of images) and operate at the same frequency of image acquisition, such as one image per second. In the example of FIG. 7, the images acquired are the images 72C and 72D.

In a step 602, the processing module 105 applies a method of detection of eyes to each image acquired. In one embodiment, the method of detection of eyes as described in the article "R. Kothari et al., Detection of eye locations in unconstrained visual images, Proceedings of International Conference on Image Processing 1996 (ICIP 96), vol. 3" (and incorporated herein by reference) is used during step 602. In one embodiment, the method of detection of eyes as described in the article "M. Flickner et al., Detecting and tracking eyes by using their physiological properties, dynamics, and appearance, Proceedings of IEEE conference on Computer Vision and Pattern Recognition, 2000 (CVPR 2000), Vol. 1" (and incorporated herein by reference) is used during step 602. In the example of FIG. 7, the collection of pixels 71C (or 71D) is detected in the image 72C (or 72D).

In a step 603, the processing module 105 determines whether at least one eye has been detected in each image. If no eye is detected in at least one image, the processing module 105 considers that no eye has been detected and returns to step 601.

Thus, it will be noted that in this embodiment the steps 601 to 603 are carried out as long as at least one eye has not been detected simultaneously in an image acquired by the camera 106C and an image acquired by the camera 106D. In other words, steps 601 to 603 are carried out repeatedly as long as no user is seated on the seat 103A.

When at least one eye is detected simultaneously in an image acquired by the camera 106C and an image acquired by the camera 106D, the processing module 105 carries out step 604. During step 604, the processing module 105 obtains, for each image acquired, a relative position between each eye detected and the predefined zone corresponding to the image acquired. In one embodiment, it is considered that, if a single eye appears in an image, the position of the eye is given by the center of its pupil; if two eyes appear in an image, the position of the two eyes is given by the middle of a segment joining the center of the two eyes, and that the position of the predefined zone is given by the center of the predefined zone. The position of an eye or a predefined zone in an image is defined along a horizontal axis and a vertical axis of the image.

In a step 605, the processing module 105 actuates at least one of the motors of the plurality of motors until each predefined zone contains at least one eye of the user seated on the seat 103A.

Figure 8:
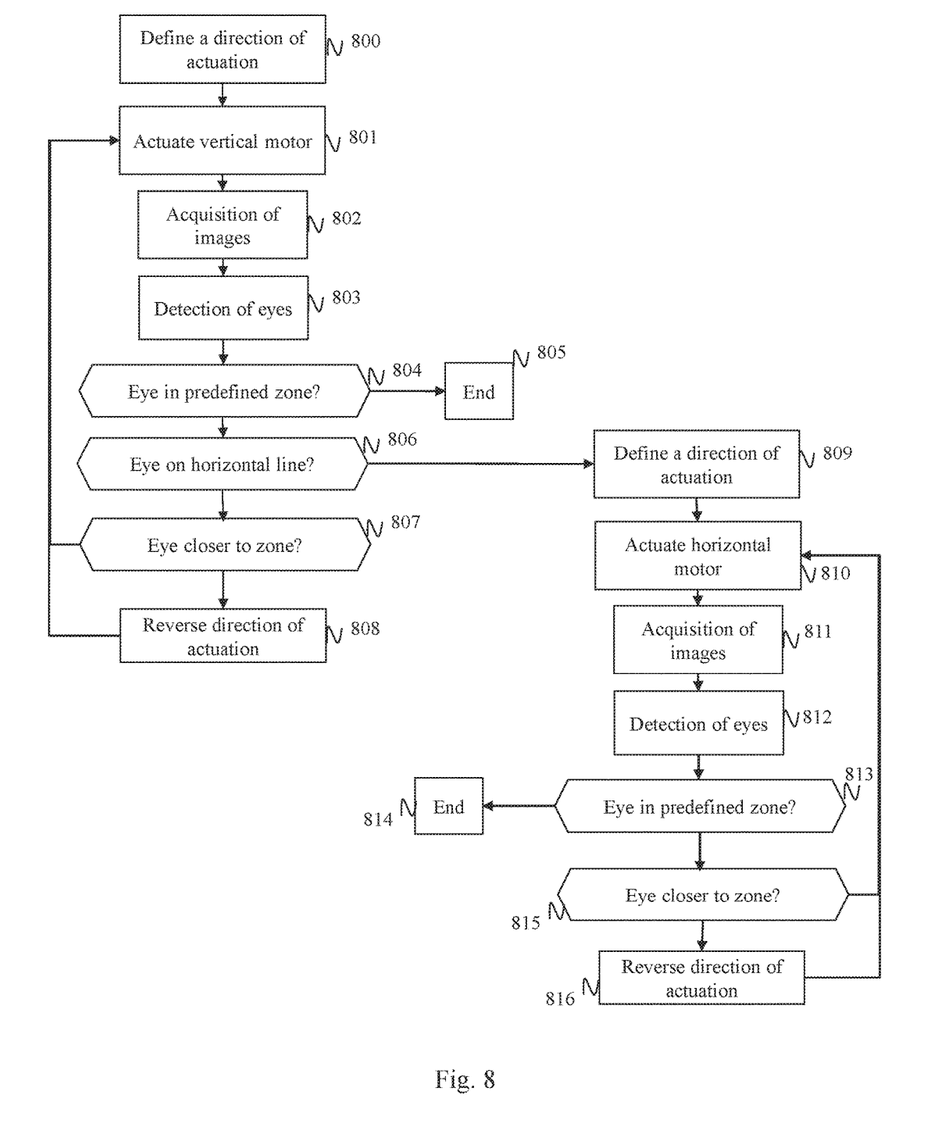
FIG. 8 describes a detail of the method of automatic positioning of a seat of an apparatus according to the invention.

FIG. 8 describes a detail of the method of automatic positioning of a seat of an apparatus according to the invention.

The method described in FIG. 8 corresponds to an exemplary embodiment of step 605. The method described in FIG. 8 is an iterative method which modifies, step by step, the position of the seat 103B to converge on the desired position (i.e., a position in which each predefined zone contains at least one eye of the user).

In a step 800, the processing module 105 defines a direction of actuation of the motor from the plurality of motors making it possible to modify the position of the seat 103A along the z-axis, or the so-called z-motor.

In a step 801, the processing module 105 actuates the z-motor so as to modify the position of the seat 103A by a predefined value. For example, the position of the seat is modified by one centimeter in the defined direction of actuation.

In a step 802, the processing module 105 actuates each camera 106C and 106D. Each camera 106C and 106D then makes an acquisition of an image.

In a step 803, the processing module 105 applies the method of detection of eyes used during step 602 to each image acquired.

In a step 804, the processing module 105 determines, for each image acquired, whether at least one eye is located in the predefined zone corresponding to that image acquired. If, in each image acquired, the predefined zone contains at least one eye, the method ends during a step 805. The seat is then considered to be adjusted.

If each predefined zone does not contain at least one eye, step 804 is followed by step 806. During step 806, the processing module 105 verifies whether the center of each eye detected in the acquired images is situated on a horizontal line of the acquired images passing through the center of the predefined zone. If the center of at least one eye detected is situated on this horizontal line or in a predetermined vicinity of the horizontal line (for example, at a distance of five pixels from the line), the processing module moves on to step 809. In this case, the processing module no longer actuates the z-motor, but instead the motor from the plurality of motors making it possible to modify the position of the seat 103A along the x-axis, the so-called x-motor.

Otherwise, step 806 is followed by step 807. During step 807, the processing module 105 determines whether, after actuating of the z-motor, the position of each eye detected in an image acquired has come closer to the position of the predefined zone corresponding to that image acquired. To do so, the processing module 105 calculates a distance between the position of each eye detected in an image acquired and the position of the predefined zone corresponding to that image. If each eye is closer, this confirms that the position of the seat has been modified in the right direction. The processing module 105 then returns to step 801. Otherwise, the processing module 105 reverses the direction of actuation of the z-motor and returns to step 801.

In step 809, the processing module defines a direction of actuation of the x-motor.

In a step 810, the processing module 105 actuates the x-motor so as to modify the position of the seat 103A by a predefined value. For example, the position of the seat is modified by one centimeter in the defined direction of actuation.

In a step 811, the processing module 105 actuates each camera 106C and 106D. Each camera 106C and 106D then makes an acquisition of an image.

In a step 812, the processing module 105 applies the method of detection of eyes used during step 602 to each image acquired.

In a step 813, the processing module 105 determines, for each image acquired, whether the predefined zone corresponding to the image acquired contains at least one eye. If in each image acquired at least one eye is situated in the predefined zone, the method ends during step 814. The seat is then considered to be adjusted.

If the processing module 105 does not find an eye in each predefined zone, step 813 is followed by step 815. During step 815, the processing module 105 determines whether, after actuation of the x-motor, the position of each eye detected in an acquired image has come closer to the position of the predefined zone corresponding to that acquired image. To do so, the processing module 105 calculates a distance between the position of each eye detected in an image acquired and the position of the predefined zone corresponding to that image acquired. If each eye is closer, this confirms that the position of the seat has been modified in the right direction. The processing module 105 then returns to step 810. Otherwise, the processing module 105 reverses the direction of actuation of the x-motor during a step 816 and returns to step 810.

In one embodiment, the method described in connection with FIG. 8 is replaced by a more direct method. In this method, based on the relative position of the eyes in each acquired image obtained during step 604, the processing module is capable of determining directly how to actuate the x- and z-motors to achieve a position of the seat in which each predefined zone contains at least one eye of the user. To do so, during a learning phase, the method described in connection with FIG. 6 has been applied to a representative set of all possible relative positions between the eyes of a user and a predefined zone in each image acquired. During this learning phase, step 605 corresponds to FIG. 8. The actuations applied to the x- and z-motors so that the eyes of a user appear in the predefined zones are memorized. A table indicating, for each possible pair of initial positions of the eyes (i.e., an initial position for the image acquired by the camera 106C and an initial position for the image acquired by the camera 106D), the actuations to be applied to the x- and z-motors, is saved in the storage unit 1053 of the processing module 105. Once the learning phase is over, when the processing module 105 detects at least one eye in each image acquired by the cameras 106C and 106D, the processing module searches in the saved table for the pair of initial positions corresponding to the detected positions of the eyes in the two images acquired. When the pair of initial positions is found, the processing module actuates the x- and z-motors according to the actuations corresponding to the pair found in the table saved.

In one embodiment, the method described in connection with FIG. 6 is applied to each start-up of the airplane 1. When a position of the seat has been found for the first time, it is saved in the storage unit 1053 of the processing module 105. The user may then leave his seat and return to it. Each time the user sits down, the seat is repositioned to the last position found. Each camera then makes an acquisition of an image and a detection of the eyes is then carried out in each image acquired to determine whether the eyes are still properly positioned in each predefined zone. If this is not the case (for example, because a pilot has been replaced by a co-pilot in the airplane (1), the method described in connection with FIG. 6 is again carried out.

In one embodiment, when a position of the seat has been found, this position may be slightly adjusted by the user around the position found by using buttons or joysticks. An adjustment zone is then predefined about the found position by the method described in connection with FIG. 6. The user will only be able to adjust the position of his seat in this predefined adjustment zone. For example, the user may adjust by more or less five centimeters along the z-axis and more or less ten centimeters along the x-axis about the found position.

In one embodiment, the user launches the method described in connection with FIG. 6 when sitting down on the seat 103A, for example, by pressing a button. In this way, the method will loop very little in steps 601 to 603.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of automatic positioning of a seat in an aircraft comprising two cameras located on either side of said seat, each one in a position able to acquire images of the face of a user seated on the seat, said seat comprising at least one motor, the at least one motor acting on a position of the seat along a predefined axis, for each camera, the method comprising the steps:

obtaining a position of a predefined image zone in which at least one eye of a user of the aircraft should be located;

acquiring an image of the user seated on the seat;

detecting at least one eye of said seated user in the image acquired;

obtaining a relative position between each eye detected and the predefined zone; and actuating the at least one motor until the predefined zone contains at least one eye of the seated user, by analyzing in a processing module the obtained relative position between each eye detected and the predefined zone.

2. The method according to claim 1, wherein the at least one motor is actuated in repeated manner to modify the position of the seat by a predefined value during each iteration, each modification of the position of the seat being followed by an acquisition of an image by each camera and a detection of the eyes in each image acquired in order to verify the position of each eye detected in each image acquired with respect to the predefined zone.

3. The method according to claim 1, wherein the method involves determining, based on each relative position obtained, how to actuate the at least one motor in order to achieve a position of the seat in which each predefined zone contains at least one eye of the user by utilizing a predefined table associating a set of possible pairs of relative positions, each relative position of a pair being associated with one of the two cameras, and an actuation to be applied to the at least one motor.

4. The method according to claim 1, wherein, when a position of the seat has been found following an automatic positioning of the seat, a bit of information representative of the position found is saved in a storage unit of the processing module, the position so saved being used when the user modifies said found position in order to leave the seat, in order to reposition the seat in the found position when the user sits down again.

5. The method according to claim 4, wherein, when the user sits down again, each detection camera makes an acquisition of an image and a detection of the eyes in each image acquired is then carried out to verify that each predefined zone contains at least one eye, the method being carried out again in its entirety if a predefined zone does not contain at least one eye.

6. The method according to claim 1, wherein, when a position of the seat has been found following an automatic positioning of the seat, the method involves: adjusting the position of the seat in a predefined zone about the found position.

7. A non-transitory computer-readable medium having computer-executable program instructions stored thereon, comprising instructions for the implementation, by a processor of a computing device, of the method according to claim 1, when said program is executed by said processor.

8. A non-transitory storage device having stored thereon computer-executable instructions for the implementation, by a processor of a device, of the method according to claim 1, when said program is executed by said processor of the device.

9. A device enabling an automatic positioning of a seat in an aircraft comprising two cameras located on either side of said seat in a position able to acquire images of the face of a user seated on the seat, said seat comprising at least one motor, the at least one motor acting on a position of the seat along a predefined axis, wherein, for each camera, the device comprises:

means of obtaining a position of a predefined image zone in which at least one eye of a user of the aircraft should be located;

means of acquisition for acquiring an image of a user seated on the seat;

means of detection for detecting at least one eye of said seated user in the image acquired;

means of obtaining a relative position between each eye detected and the predefined zone; and means of actuation for actuating the at least one motor until the predefined zone contains at least one eye of the seated user, by analyzing in a processing module the obtained relative position between each eye detected and the predefined zone.

10. A system enabling an automatic positioning of a seat in an aircraft comprising two cameras located on either side of said seat in a position able to acquire images of the face of a user seated on the seat, and a device according to claim 9.

* * * * *